Patented Aug. 25, 1936

2,052,477

UNITED STATES PATENT OFFICE 2,052,477

AZO-DYESTUFFS AND THEIR MANUFACTURE

Adolf Krebser, Riehen, near Basel, Switzerland, assignor to the firm J. R. Geigy A. G., Basel, Switzerland No Drawing. Application October 16, 1935, Serial No. 45,358. In Switzerland November 5, 1934

12 Claims. (Cl. 260—97)

This invention consists in the manufacture of new valuable monoazo-dyestuffs capable of being chromed by coupling the diazo-compound from 4-nitro-2-amino-phenol-6-sulphonic acid with a phenol containing in para-position an alkyl-group with at least 3 and at most 5 carbon atoms.

The new dyestuffs are dark powders and dye wool in an acid bath yellow-brown tints. When chromed these tints change to a valuable full brown with excellent properties of fastness. The dyestuffs may also be converted into the chromium complex before their application in the dyeing process.

The following examples illustrate the invention:

Example 1

23.4 kilos of 4-nitro-2-aminophenol-6-sulphonic acid are diazotized by the usual method. The excess of mineral acid is buffered by means of sodium bicarbonate and the diazonium solution is added, while stirring, to a solution of 16.5 kilos of para-tertiary-amyl-phenol in 6 kilos of caustic potash lye of 100 per cent strength and 50 litres of water. When coupling is complete the dyestuff is salted out, filtered and dried. The formation of the dyestuff can be facilitated by the presence of pyridine.

The dyestuff is a brown powder soluble in water and in concentrated sulphuric acid to yellow-brown solutions.

If in this example para-tertiary-amyl-ortho-cresol is used as coupling component, a dyestuff with similar properties is obtained.

Example 2

For the quantity of para-tertiary-amyl-phenol used for coupling in Example 1 there is substituted 13.5 kilos of para-iso- or normal-propyl-phenol or 15 kilos of para-tertiary-butyl-phenol, or para-isobutyl-ortho-cresol, the quantity of the diazonium solution being the same as prescribed in Example 1; there are obtained brown chrome-dyestuffs with similar excellent properties of fastness.

What I claim is:—

1. A process for the manufacture of azo-dyestuffs, consisting in coupling diazotized 4-nitro-2-aminophenol-6-sulphonic acid with a monocycle phenol containing as a substituent in para-position an alkyl-group with at least 3 and at most 5 carbon atoms.

2. A process for the manufacture of azo-dyestuffs, consisting in coupling diazotized 4-nitro-2-aminophenol-6-sulphonic acid in the presence of pyridine with a monocyclic phenol containing as a substituent in para-position an alkyl-group with at least 3 and at most 5 carbon atoms.

3. A process for the manufacture of azo-dyestuffs, consisting in coupling diazotized 4-nitro-2-aminophenol-6-sulphonic acid with a monocyclic phenol containing as a substituent in para-position an alkyl-group with 3 carbon atoms.

4. A process for the manufacture of azo-dyestuffs, consisting in coupling diazotized 4-nitro-2-aminophenol-6-sulphonic acid with a monocyclic phenol containing as a substituent in para-position an alkyl-group with 4 carbon atoms.

5. A process for the manufacture of azo-dyestuffs, consisting in coupling diazotized 4-nitro-2-aminophenol-6-sulphonic acid with a monocyclic phenol containing as a substituent in para-position an alkyl-group with 5 carbon atoms.

6. A process for the manufacture of azo-dyestuffs, consisting in coupling diazotized 4-nitro-2-aminophenol-6-sulphonic acid in the presence of pyridine with a monocyclic phenol containing as a substituent in para-position an alkyl-group with 3 carbon atoms.

7. A process for the manufacture of azo-dyestuffs, consisting in coupling diazotized 4-nitro-2-aminophenol-6-sulphonic acid in the presence of pyridine with a monocyclic phenol containing as a substituent in para-position an alkyl-group with 4 carbon atoms.

8. A process for the manufacture of azo-dyestuffs, consisting in coupling diazotized 4-nitro-2-aminophenol-6-sulphonic acid in the presence of pyridine with a monocyclic phenol containing as a substituent in para-position an alkyl-group with 5 carbon atoms.

9. A process for the manufacture of an azo-dyestuff, consisting in coupling diazotized 4-nitro-2-aminophenol-6-sulphonic acid with para-tertiary-amyl-phenol.

10. A process for the manufacture of an azo-dyestuff, consisting in coupling diazotized 4-nitro-2-aminophenol-6-sulphonic acid with para-isobutyl-o-cresol.

11. A process for the manufacture of an azo-dyestuff, consisting in coupling diazotized 4-nitro-2-aminophenol-6-sulphonic acid with para-isobutyl-o-cresol in the presence of pyridine.

12. Azo-dyestuffs from diazotized 4-nitro-2-aminophenol-6-sulphonic acid and a monocyclic phenol containing as a substituent in para-position an alkyl-group with at least 3 and at most 5 carbon atoms, said dyestuffs being soluble in water and in concentrated sulphuric acid to yellow-brown solutions and dyeing wool in an acid bath yellow-brown tints which when chromed become a valuable full brown of excellent properties of fastness.

ADOLF KREBSER.